United States Patent
Wendt et al.

(10) Patent No.: US 11,054,839 B2
(45) Date of Patent: Jul. 6, 2021

(54) MOBILE ROBOTIC DEVICE THAT PROCESSES UNSTRUCTURED DATA OF INDOOR ENVIRONMENTS TO SEGMENT ROOMS IN A FACILITY TO IMPROVE MOVEMENT OF THE DEVICE THROUGH THE FACILITY

(71) Applicant: Robert Bosch GmbH, Stuttgart (DE)

(72) Inventors: Axel Wendt, Ostfildern (DE); Rares Ambrus, Jud Arad (RO); Sebastian Claici, Cambridge, MA (US)

(73) Assignee: Robert Bosch GmbH, Stuttgart (DE)

( * ) Notice: Subject to any disclaimer, the term of this patent is extended or adjusted under 35 U.S.C. 154(b) by 200 days.

(21) Appl. No.: 16/474,702

(22) PCT Filed: Dec. 28, 2017

(86) PCT No.: PCT/EP2017/084749
§ 371 (c)(1),
(2) Date: Jun. 28, 2019

(87) PCT Pub. No.: WO2018/122335
PCT Pub. Date: Jul. 5, 2018

(65) Prior Publication Data
US 2019/0324474 A1    Oct. 24, 2019

Related U.S. Application Data

(60) Provisional application No. 62/440,795, filed on Dec. 30, 2016, provisional application No. 62/512,223, filed on May 30, 2017.

(51) Int. Cl.
G05D 1/02         (2020.01)
(52) U.S. Cl.
CPC ......... *G05D 1/0274* (2013.01); *G05D 1/0219* (2013.01); *G05D 1/0238* (2013.01); *G05D 1/0242* (2013.01); *G05D 2201/0207* (2013.01)

(58) Field of Classification Search
CPC .. G05D 1/0274; G05D 1/0219; G05D 1/0238; G05D 1/0242; G05D 2201/0207
See application file for complete search history.

(56) References Cited

U.S. PATENT DOCUMENTS

| 7,728,833 | B2 * | 6/2010 | Verma ................. G06T 17/20 345/420 |
| 2013/0176305 | A1 | 7/2013 | Ito et al. |

(Continued)

OTHER PUBLICATIONS

Segway RMP 210/220 User Manual (Year: 2014).*

(Continued)

*Primary Examiner* — Michael J Zanelli
(74) *Attorney, Agent, or Firm* — Maginot, Moore & Beck LLP (57) ABSTRACT

A mobile robotic device receives point cloud data corresponding to an internal space of a facility and processes the data to generate a map of the facility that enables the mobile robotic device to move within the internal space. The processing of the point cloud data includes segmentation of the data into planar primitives that are identified as ceiling, floor, or wall primitives. Openings in the wall primitives are identified as doors or occlusions. Viewpoints for the processed planar primitives are generated and a complex cell data structure is generated with vertices representing faces of the structure and edges representing walls. After an energy minimization of the complex cell structure is performed, adjacent regions of space are evaluated for merger and a map of the internal space is generated. The mobile robotic device moves through the internal space of the facility with reference to the map.

9 Claims, 8 Drawing Sheets

(56) References Cited

U.S. PATENT DOCUMENTS

2018/0074508 A1* 3/2018 Kleiner ............... A47L 9/2852
2018/0330184 A1* 11/2018 Mehr ..................... G06F 30/13

OTHER PUBLICATIONS

Susperregi et al.; Thermal and 3D Kinect Sensor Fusion for Robust People Detection using Evolutionary Selection of Supervised Classifiers; ICINCO 2013—Proc. of the 10th Intl. Conf. on Informatics in Control Automation and Robotics (Year: 2013).*

Awrangjeb et al.; Automatic Building Footprint Extraction and Regularisation from LIDAR Point Cloud Data; 2014 Intl. Conf. on Digital Image Computing: Techniques and Applications (DICTA) (Year: 2014).*

Jeon et al.; Real-time building of a 3D Model of an Indoor Environment with a Mobile Robot; 2011 11th Intl. Conf. on Control, Automation and Systems; Oct. 26-29, 2011 (Year: 2011).*

International Search Report corresponding to PCT Application No. PCT/EP2017/084749 dated Feb. 13, 2018 (2 pages).

Pitzer, Benjamin, "Automatic Reconstruction of Textured 3D Models," KIT Scientific Publishing, 2014 (172 pages).

* cited by examiner

MOBILE ROBOTIC DEVICE THAT PROCESSES UNSTRUCTURED DATA OF INDOOR ENVIRONMENTS TO SEGMENT ROOMS IN A FACILITY TO IMPROVE MOVEMENT OF THE DEVICE THROUGH THE FACILITY

CLAIM OF PRIORITY

This application is a 35 U.S.C. § 371 National Stage Application of PCT/EP2017/084749, filed on Dec. 27, 2018, which claims priority to U.S. Provisional Application No. 62/440,795, which is entitled "Automatic Room Segmentation From Unstructured 3D Data of Indoor Environments," and was filed on Dec. 30, 2016, and also claims priority to U.S. Provisional Application No. 62/512,223, which is entitled "Automatic Room Segmentation From Unstructured 3D Data of Indoor Environments," and was filed on May 30, 2017, the entire contents of which are hereby expressly incorporated by reference herein.

TECHNICAL FIELD

This disclosure relates generally to point cloud data processing, and more specifically, to the generation of facility room maps to enable mobile robotic device maneuvering within the facility.

BACKGROUND

Precise measurements of rooms in a home or other building are important for a wide range of tasks, such as topological mapping, semantic mapping, automatized professional cleaning, or human-robot interaction. In many cases, the locations and dimensions of the rooms in a facility are unknown and blue prints or other architectural drawings are unavailable for use during the project. Instead, scanners can be used to generate point cloud data that correspond to structures defining rooms and doors connecting the rooms in the facility.

Several difficulties arise in the processing of point cloud data by mobile robotic devices. Among these issues are noise from registration errors or missing data. Additionally, interiors of buildings are frequently cluttered with furniture and other objects that can partially or fully occlude permanent room structures. For example, bookshelves often span the entire height of a wall and have significant length. Recognition of these occluding structures so they can be removed from the map of the rooms in a facility can be difficult.

In presently known mobile robotic devices, the processing of point cloud data makes a number of assumptions about the data to simplify the tasks involved in processing the data. These assumptions include the up vectors for straight walls, alignment in a Manhattan world frame, or knowledge of the view point of the scanning device. A Manhattan world frame assumes that every plane is perpendicular to one of the axes of a single coordinate system. These unrealistic assumptions render less accurate maps of the walls, ceilings, floors, and openings in the walls in a facility. Processing of point cloud data to produce more accurate maps without unrealistic assumptions would be beneficial to the movement of robotic devices within a facility and the interaction of these devices with humans.

SUMMARY

A mobile robotic device has been developed that processes point cloud data to render accurate maps of rooms, floors, ceilings, and openings in the walls without the assumptions of a Manhattan world frame or a priori knowledge of the view point of the scanners. The mobile robotic device includes at least one motive member, an actuator operatively connected to the at least one motive member, the actuator being configured to drive the motive member to move the mobile robotic device, a data interface configured to receive point cloud data of a facility in which the robotic device operates, a memory, and a controller operatively connected to the actuator, the data interface, and the memory. The controller is configured to store the point cloud data received from the data interface in the memory, to segment the point cloud data into planar primitives, to detect openings in planar primitives that correspond to walls, to generate viewpoints for the planar primitives that correspond to ceilings and walls, to generate a map of rooms with reference to the generated viewpoints, and to operate the actuator with reference to the generated map to move the mobile robotic device through the rooms represented in the generated map.

A further aspect of the mobile robotic device further includes an image sensor configured to generate image data of an environment about the mobile robotic device, a distance sensor configured to generate data corresponding to a distance between the mobile robotic device and structure in a path of the mobile robotic device, and the controller is operatively connected to the image sensor and the distance sensor. The controller is further configured to detect objects, walls, and openings in the walls about the mobile robotic device to locate the mobile robotic device with reference to the generated map.

A further aspect of the mobile robotic device includes the controller being further configured to identify wall primitives in the planar primitives segmented from the point cloud data, identify ceiling primitives in the planar primitives segmented from the point cloud data, identify floor primitives in the planar primitives segmented from the point cloud data, identify the detected openings in the identified wall primitives as either doors or occlusions, and generate the viewpoints with reference to the wall primitives and the ceiling primitives.

A further aspect of the mobile robotic device includes the controller being further configured to identify wall primitives, ceiling primitives, and floor primitives by projecting all of the data values in the point cloud data onto a two-dimensional grid aligned with an XY plane, identifying all of the data values in the two-dimensional grid having a largest coordinate corresponding to height as belonging to one of the identified ceiling primitives, identifying all of the points in the two-dimensional grid having a lowest coordinate corresponding to height as belonging to one of the floor primitives, and identifying points in a plane between one of the ceiling primitives and one of the floor primitives as belonging to one of the wall primitives.

A further aspect of the mobile robotic device includes the controller being further configured to define each wall primitive as a Hessian normal form, aligning a reference frame with each wall primitive, projecting all of the data values identified as belonging to each wall primitive onto an image, detecting openings in the image of each wall primitive, and identifying the detected openings as doors or occlusions by comparing a shape of each detected opening to predetermined dimension and shape criteria.

A further aspect of the mobile robotic device includes the controller being further configured to project each ceiling primitive onto one of the floor primitives, identify all data values within a boundary of the floor primitive onto which the ceiling primitive was projected as free space, identified each wall primitive having identified openings within the boundary of the floor primitive onto which the ceiling primitive was projected as obstacle space, perform an energy minimization of the free space and obstacle space, identify a medial axis for each contiguous area of free space within the boundary of the floor primitive onto which the ceiling primitive was projected, select data values that lie along the medial axis for each contiguous area of free space as viewpoints, select data values with a predetermined radius about each selected data value on the medial axis until a number of data values not selected in each contiguous area of free space is less than a predetermined threshold.

A further aspect of the mobile robotic device further includes the predetermined radius corresponding to a range of a scanner used to produce the point cloud data.

A further aspect of the mobile robotic device includes the controller being further configured to select data values in the point cloud data that are within a sphere centered at each viewpoint in contiguous area of free space, label the selected data values to identify the selected data values as corresponding to the viewpoint about which the sphere was centered to select the data values, project the selected data values corresponding to one of the viewpoints onto a face of a cell complex data structure, perform an energy minimization of a dual graph corresponding to the cell complex data structure, the dual graph having unary potentials associated with vertices representing faces in the cell complex data structure and binary potentials associated with edges representing walls in the cell complex data structure.

A further aspect of the mobile robotic device includes the controller being further configured to detect overlap between one of the edges separating different contiguous areas of free space and the wall primitives adjacent the different contiguous areas, merging the different contiguous areas of free space in response to the detected overlap being less than a predetermined threshold.

DETAILED DESCRIPTION

For the purposes of promoting an understanding of the principles of the embodiments described herein, reference is now made to the drawings and descriptions in the following written specification. No limitation to the scope of the subject matter is intended by the references. This patent also includes any alterations and modifications to the illustrated embodiments and includes further applications of the principles of the described embodiments as would normally occur to one skilled in the art to which this document pertains.

As used herein, the term "mobile robotic device" refers to any computing device having motive mechanisms for maneuvering the device through rooms within a facility. As used herein, a reference to "point cloud data" refers to a set of data points in some coordinate system that represent an external surface of a structure. Such data are well-known and can be generated by scanners from one or more particular viewpoints.

Figure 1:
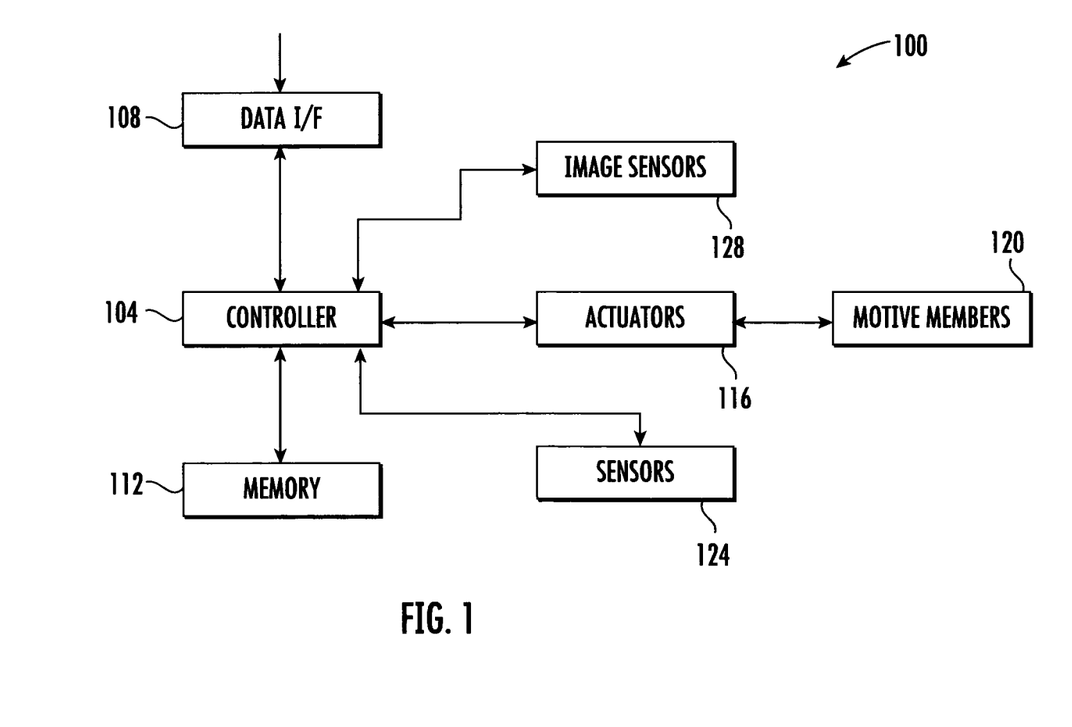
FIG. 1 is a block diagram of a robotic device that processes unstructured 3D data for mapping a facility to enable movement of the device through the facility.

FIG. 1 depicts a mobile robotic device 100 that processes point cloud data to generate maps of rooms in a facility to enable movement of the device through the facility. The system 100 includes a controller 104 operatively connected to a data interface 108, a memory 112, one or more actuators 116, motive members 120, sensors 124, and image sensors 128. The controller 104 receives point cloud data of a facility through the data interface and the controller stores the point cloud data in the memory 112 for processing. The memory 112 also includes stored programmed instructions that the controller executes to process the point cloud data and to use the maps generated by such processing to control the operations of the components in the robotic device 100 that move the robotic device about a facility.

The data interface 104 is any appropriate interface corresponding to a standard capable of receiving and transmitting point cloud data with a point cloud data source. Memory 112 is volatile and non-volatile memory for the temporary storage and processing of data and the persistent storage of programmed instructions and reference data. The actuators 116 are motors and other drivers operatively connected to motive members 120. Motive members 120 are components that convert the output of the actuators into movement of the device 100. Motive members include wheels, gears, articulated members, and the like to move the robotic device through a facility and perform other tasks, such as gripping and moving objects in the environment of the facility. The sensors 104 are distance and other environmental sensors, such as laser range finders, sonic sensors, mechanical sensors, and the like. The image sensors 128 are CCD cameras and other image data sensing devices, such as infrared sensors. The sensors and the image sensors generate data that is processed by the controller 104 to enable the device 100 to locate its position within the facility environment with reference to the map of the facility generated from the point cloud data.

Figure 2:
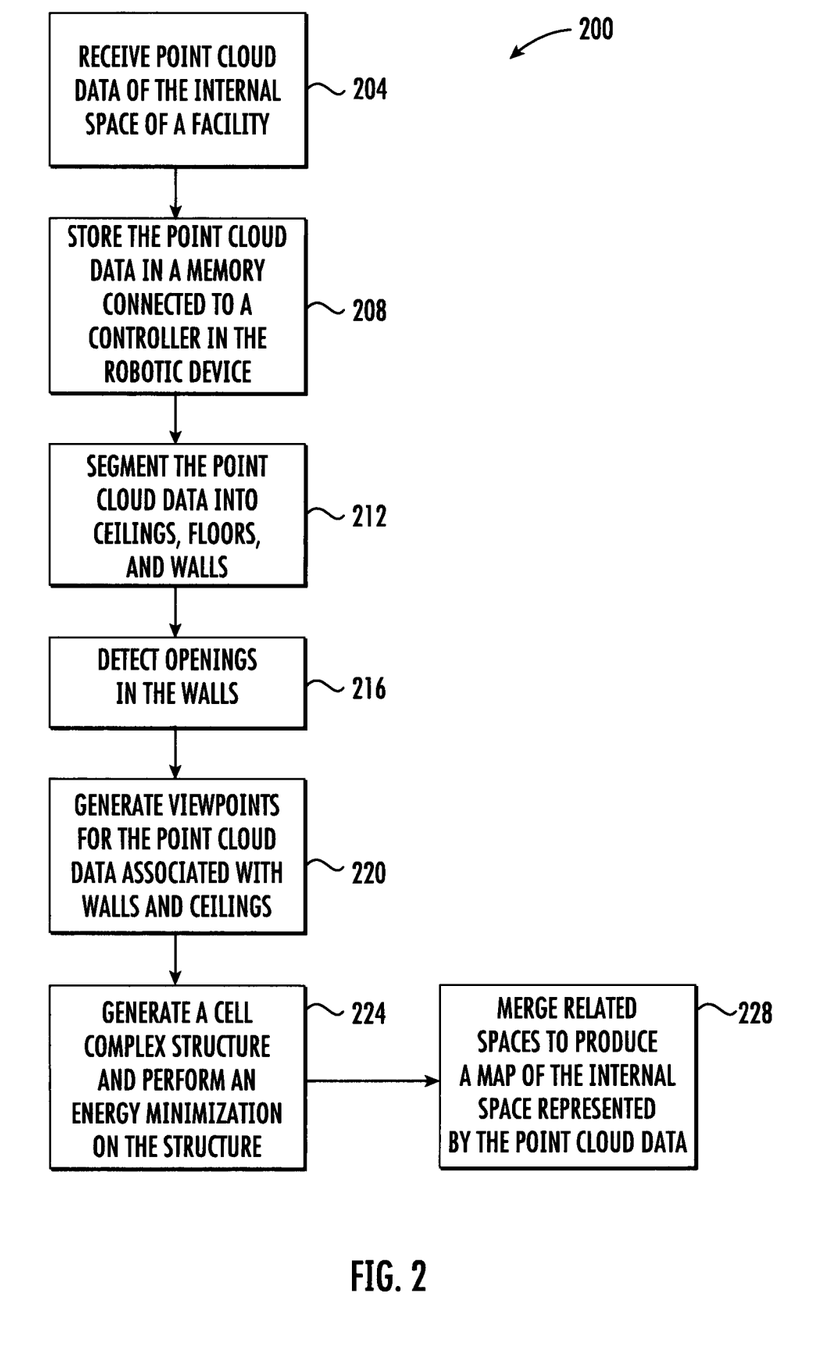
FIG. 2 is a flow diagram of a process 200 for processing point cloud data to produce a map of the rooms, doors, and ceilings in a facility.

To enable the robotic device to navigate the rooms of a facility more facilely and accurately, the device 100 has been configured with programmed instructions and components that enable the controller 124 to process the point cloud data and segment the data into rooms with ceilings and openings in walls without the assumptions for the processing of such data known in the past. An overview of this process is shown in FIG. 2. In the process 200, the robotic device communicates with a point cloud data source through the data interface 104 to receive point cloud data corresponding to a facility in which the robotic device is to be used (block 204). These data are stored in the memory 108 (block 208). The process then segments the point control data into wall, floor, and ceiling primitives (block 212). As used in this patent, the term "segment" refers to the identification of groups of data values in the point cloud as corresponding to wall primitives, ceiling primitives, or floor primitives. Openings in the wall primitives are detected (block 216) and viewpoints for the ceiling and wall primitives are generated (block 220). The process generates a cell complex data structure from a 2D projection of the ceiling and wall primitives and an energy minimization of the structure is performed (block 224). Related spaces are merged to produce a map of the internal space represented by the point cloud data (block 228). This map is maintained in the memory 112 and the controller references the map to locate the position of the device 100 in the facility using the image and environmental data received from the image and environmental sensors 124 and 128.

Figure 3:
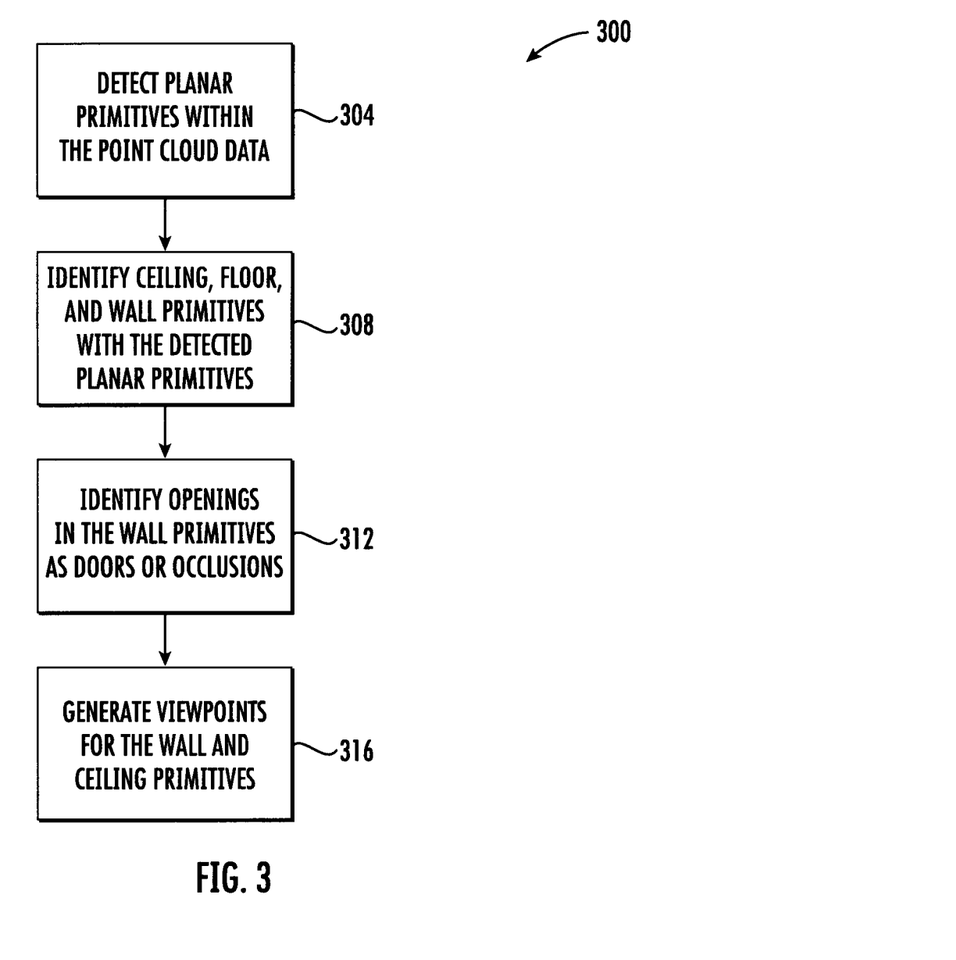
FIG. 3 is a flow diagram of a process for segmenting the point cloud data into planar primitives.

Details of the point cloud data segmentation processing is shown in FIG. 3. The process 300 begins by detecting primitive shapes of arbitrary orientations and sizes in the point cloud data (block 304). As used in this patent, the term "primitive" refers to point cloud data representing a structure in the facility. The primitives are then processed to identify the primitives as wall, floor, or ceiling primitives (block 308). Openings in the wall plane primitives are then detected and identified as being either doors or occlusions (block 312). Viewpoints for the wall and ceiling primitives are generated (block 316) to complete the segmentation processing of the point cloud data.

Figure 4:
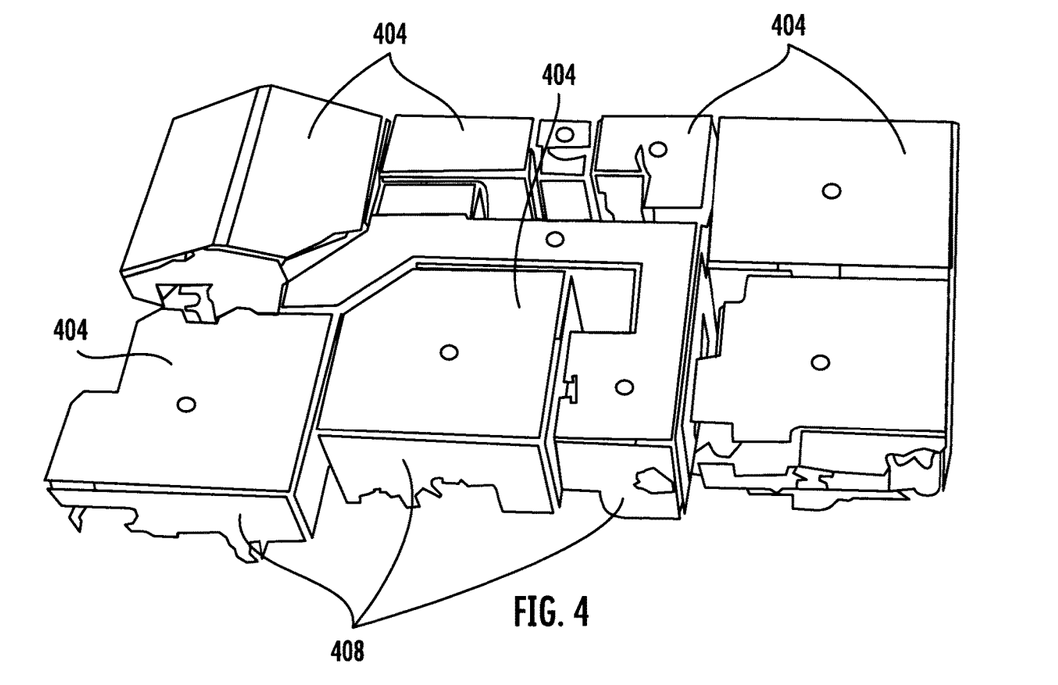
FIG. 4 is a graphical depiction of ceiling and wall primitives in point cloud data.

In more detail, the primitive shape detection is achieved by describing each primitive shape with a parametric model and a set of supporting indices that represent data values in the original point cloud that are within a predetermined threshold distance from one another. Although the discussion in this patent focuses on planar shapes, other shapes can be detected, such as cylinders and spheres. Ceiling primitives are detected by projecting all of the data values in the point cloud onto a two-dimensional (2D) grid aligned with an XY plane. As used in this patent, the term "projecting" or "projection" refers to a mapping of data values from the point cloud to a predetermined arrangement of cells, which is called a grid. For each occupied cell in the grid, the data values in the cell having the largest Z coordinate value are identified as the relevant ceiling primitive. Floor primitives are identified by selecting the data values in the occupied cells having the smallest Z coordinates. Wall primitives are defined as planar areas of data values that extend between the floor primitive and the ceiling primitive. To simplify processing, the normal to the wall primitive is required to be perpendicular to the floor up vector. As used in this patent, the term "floor up" vector refers to a vector that extends in a direction from the floor to the ceiling primitive. The process for detecting wall primitives is known as a Random Sample Consensus process. The wall primitives conforming to these criteria still contain false positives such as data corresponding to appurtenant features, such as cupboards, shelves, screens and the like so they require further processing to identify the wall primitives in the point cloud accurately. FIG. 4 is a representation of planar primitives extracted from a point cloud before the openings in the wall primitives have been detected and identified. Structures 404 are examples of ceiling primitives and structures 408 are examples of wall primitives.

Processing of the wall primitives presents issues since the point cloud data processed by the controller 104 in the device 104 does not include viewpoint data. To help simplify the processing of the wall primitives, each wall primitive is processed to detect gaps in the wall primitives that are either identified as openings, such as doors, or occlusions produced by clutter between the scanner that generated the point cloud data and the wall being scanned. Each wall primitive is defined in Hessian normal form. A 2D reference frame is positioned in the plane of a candidate wall primitive with its origin aligned to the lower left corner of the plane when looking at the plane along the Hessian normal vector to the plane. One column of the reference frame is the floor up vector and another column of the frame lies in the plane and is the cross-product of the Hessian normal vector and floor up vector. Using this reference frame, all of the data values of the wall primitive are projected to an image that is analyzed for openings and gaps. In this image projection, the data values not corresponding to the plane of the wall primitive are identified as opening data values and areas of contiguous opening data values are identified as openings. Those openings that satisfy shape and predetermined dimension criteria are identified as door opening candidates. The shape criteria in one embodiment is rectangular and predetermined dimension criteria refer to a predetermined height and width.

Figure 5A:
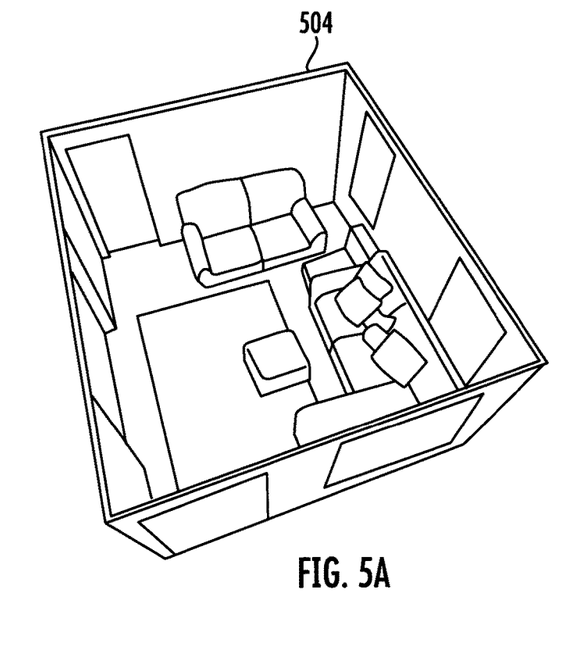
FIG. 5A is a perspective view of a room represented by point cloud data.
Figure 5B:
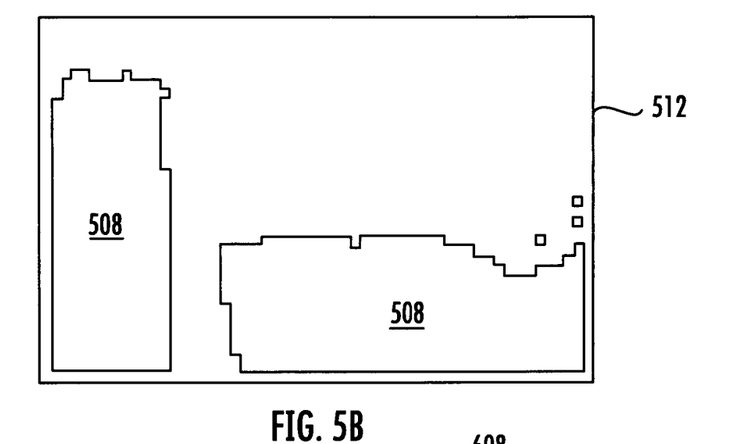
FIG. 5B is a 2D projection of a wall primitive shown in FIG. 5A and the openings within the wall primitive.

An example of the wall primitive processing is shown in FIG. 5A and FIG. 5B. FIG. 5A depicts a point cloud of a room where the wall primitive corresponding to a back wall 504 is processed. FIG. 5B is the image projection of the back wall 504 onto the 2D frame with empty pixels denoting opening data values and solid pixels representing wall data values. In FIG. 5B, the contiguous empty pixels 508 are identified as a door opening candidates in the back wall 504 in FIG. 5A, while the contiguous solid pixels 512 are identified as wall space. The door opening candidate in the right portion of the image shown in FIG. 5B is identified as an occlusion caused by the furniture in front of the back wall 504 in FIG. 5A because that region of empty pixels does not comply with the dimension requirements for a door.

Figure 6:
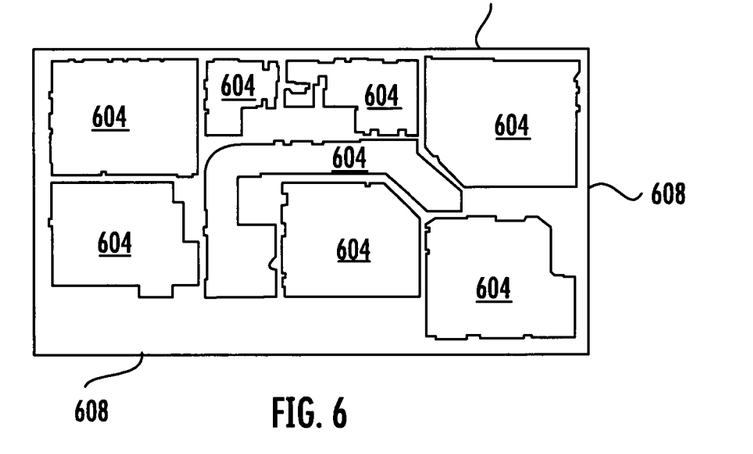
FIG. 6 is a graphical depiction of a 2D projection of point cloud data for ceiling and wall primitives of a facility after an energy minimization of the point cloud data corresponding to the ceiling and wall primitives has been performed.
Figure 7:
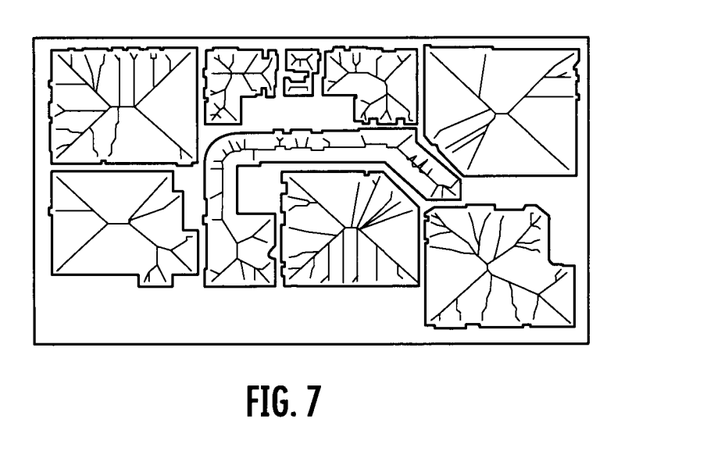
FIG. 7 is a graphical depiction of the Voronoi graphs of the ceiling primitives shown in FIG. 6.
Figure 8:
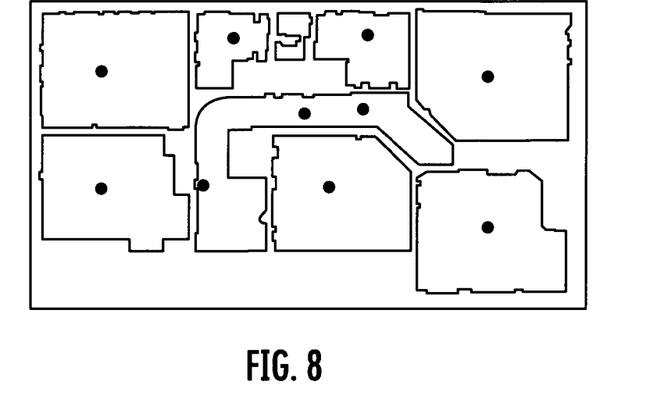
FIG. 8 is a graphical depiction of the viewpoints identified for the 2D projection in FIG. 6 with reference to the Voronoi graphs of FIG. 7.

In more detail, the generation of the viewpoint (block 316 in FIG. 3) begins with a 2D projection of the ceiling primitives onto the floor primitive. As shown in FIG. 6, all data values within a boundary for the floor primitive are identified as free space 604 except for the wall primitives and identified openings, which are identified as obstacle space 608. This projection is noisy in areas with low ceiling point densities and at intersections between ceiling primitives and wall primitives. An energy minimization of the projection provides a refined foreground/background segmentation that is less noisy. The projection shown in FIG. 6 has been subjected to an energy minimization. This 2D projection is comprised of free space (white pixels) and obstacle space (black pixels). Computing the medial axis of each free space segment provides the resulting Voronoi graph of the space. The Voronoi graphs of the free space segments in the projection of FIG. 6 are shown in FIG. 7. Viewpoints having the greatest visible view lie along the medial axes of the free space segments. To sample which of these viewpoints presents the best viewpoint, a pixel is selected that observes the most pixels within a predetermined radius about the selected pixel. Another viewpoint is then selected with the goal that it views a majority of the remaining unviewed pixels. This viewpoint selection continues until the free space pixels not visible from at least one viewpoint is less than a predetermined threshold. The predetermined radius corresponds to the operating range of the scanner used to produce the point cloud to ensure that, even in cases of a large room, multiple viewpoints are identified so the room is over-segmented. In one embodiment, the predetermined radius is 3 meters. An example of this type of processing for the Voronoi graph shown in FIG. 7 is depicted in FIG. 8 with the viewpoints for the various rooms identified by the darker circles in the free space segments. To recover viewpoints in the original point cloud, the identified 2D viewpoints are projected back into the original 3D point cloud at the mean height.

An alternative approach to the processing described above with regard to FIG. 7 and FIG. 8 is to apply a flood fill process to the projection of FIG. 6. Because rooms typically cluster in connected points, application of a flood fill process to the filtered projection would identify the semantic labels for the segments of the projection. This approach is not as effective as the one described above because it relies on almost perfect wall and opening detection and produces a projection that has very jagged walls caused by the loss of resolution that occurs during the 2D projection. Some approaches overcome these limitations by requiring the point cloud to include viewpoint data, but the generation of the Voronoi graph and the processing of that graph as described above avoids this restraint on the production of the point cloud data.

Figure 9:
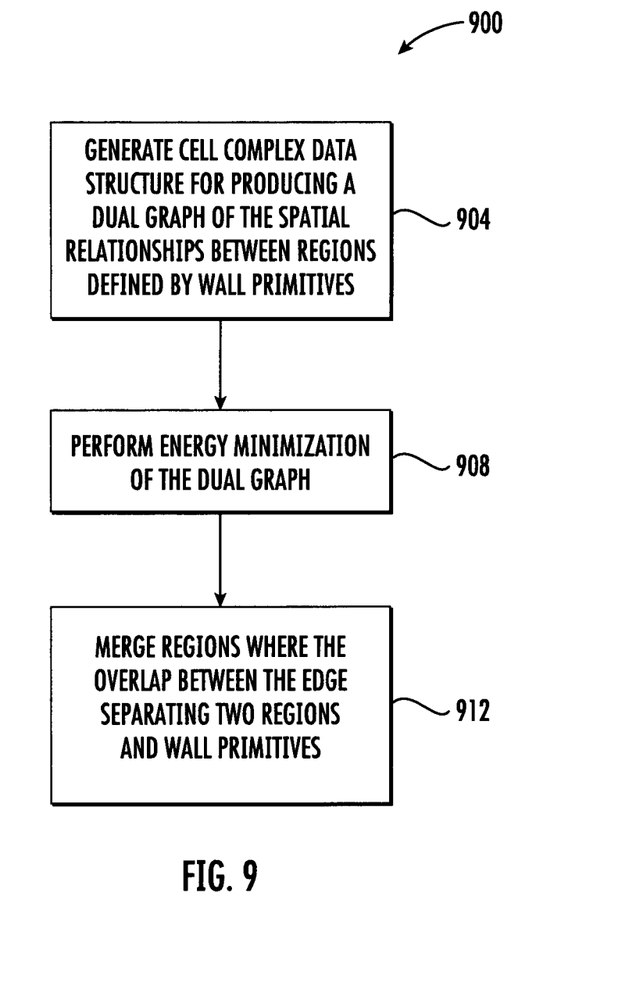
FIG. 9 is a flow diagram of a process for room construction performed with reference to the 2D projection of FIG. 6 and the identified viewpoints of FIG. 8.

Following the room segmentation process of FIG. 3, the room reconstruction process of FIG. 9 is performed. In the process 900, a cell complex data structure is generated (block 904) and an associated dual graph of the cell complex data structure is subjected to energy minimization (block 908). Merger of regions identified as free space then occurs to remove walls inferred by the energy minimization (block 912). The resulting map is then stored in the memory 112 of the controller 104 so the controller can operate the actuators 116 to drive the motive members 120 and move the robotic device 100 with reference to the room reconstruction map.

In further detail, the cell complex data structure is a geometric data structure that describes how the intersection of a set of lines partitions space. To generate the cell complex, the data values associated with each wall segment are projected onto the ground floor and a line of best fit is found by solving the associated least-squares problem. With facilities that include curved walls, piecewise linear approximations of the projected curve are identified and each individual line segment is inserted into the cell complex.

Figure 10:
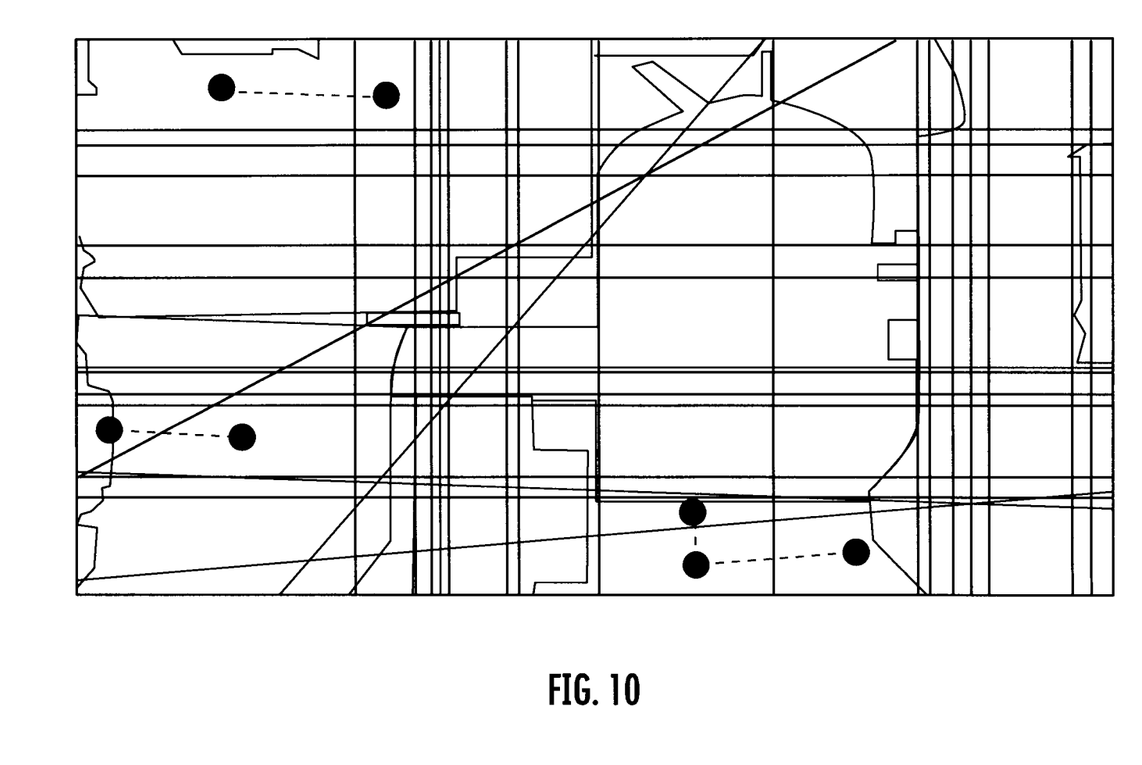
FIG. 10 depicts an example of the main components of a cell complex data structure.

The cell complex induces a planar graph in Euclidean space with vertices representing intersections between line segments with edges naturally induced by the segments. Every planar graph induces a dual graph with vertices representing faces in the primal graph and edges representing walls between adjacent faces. The resulting dual graph is used to label the faces. FIG. 10 depicts an example of the main components of a cell complex data structure. The full primal graph is shown as dark edges. Some dual vertices corresponding to primal faces are shown in the figure by solid circles and some dual edges are shown as dashed lines in the figure.

Use of the cell complex and the associated dual graph begins by defining an energy minimization problem on the dual graph by associating unary potentials with the vertices representing the faces in the cell complex and by associating binary potentials with the edges representing the walls. The resulting problem has the form:

$$\min_l \sum_{v \in V} U_v(l_v) + \sum_{v,w \in E} B_{v,w}(l_v, l_w) \quad (1)$$

where $l \in \mathcal{L}^{|V|}$ is a per vertex label vector drawn from a finite labeling set, $U_v : \mathcal{L} \to [0, 1]$ is the unary potential function associated with vertex $v$, and $B_{v,w}: \mathcal{L} \times \mathcal{L} \to [0, 1]$ is the binary potential function associated with the edge $(v,w)$.

Importantly, the true number of rooms must at least equal $|\mathcal{L}|$. This condition means that the initial segmentation has to be overly segmented. The unary potentials in the cell complex structure describe the likelihood that regions have an associated (coarse) labeling obtained from the overly segmented data. Thus, the unary potentials are a guess on the true partitioning of the rooms. To define easy to compute unary potentials, the rooms are assumed to be close to convex. Using the synthetic viewpoints generated previously from the Voronoi graphs, data values within a fixed radius of each viewpoint are labeled with reference to the corresponding viewpoint by a spherical projection in the point cloud centered at each viewpoint. This relationship arises from the likelihood that data values that can be seen from the same viewpoint are more likely to be part of the same room. The data values labeled as belonging to one of the viewpoints are used to obtain a unary potential for each corresponding face since faces correspond to vertices in the dual graph. For each face in the cell complex, a density of the points associated with the projection of the face to the plane is computed.

The unary potential associated with each face is defined as a ratio of the points associated with the viewpoint for the face over all points that fall within the face. Let $c_{ij}$ be the number of data values associated with a viewpoint j that fall in face i. For each face i, a potential is defined by:

$$\theta_j^i = \frac{c_{ij}}{\sum_j c_{ij}}.$$

Faces that correspond to an empty space are detected in the cell complex by computing a point density per unit area. In one embodiment, the subsampling grid size is given as 0.05 m so the average density is computed for each square meter. If the density is not within a given factor of the average density, the face is marked as empty space. A fictitious viewpoint is labeled 0 for the empty spaces and for each empty region a potential $\theta_j^i = 1 \neq 0$ and $\theta_j^i = 0$ if j=0.

Binary potentials are obtained from information about the wall primitives. Each edge in the cell complex is within the linear span of a wall primitive. If e represents the cell complex edge and w represents the original wall primitive, then a binary potential between the two faces separated by the edge e is obtained as:

$$B_{u,v}(l_u, l_v) = \begin{cases} 0 & \text{if } l_u = l_v \\ 1 - \frac{|e \cap w|}{|e|} & \text{otherwise} \end{cases}.$$

The |e| denotes the length of the segment e and e ∩ w is the segment intersection of e and w. This intersection can be a segment, a point, or empty. This potential describes the likelihood that two regions are contained within the same room. If a large wall primitive separates the two regions, then the regions are unlikely to cluster together. The condition that $B_{u,v}(1,1)=0$ must be observed to maintain semi-metricness of the B function.

Figure 11A:
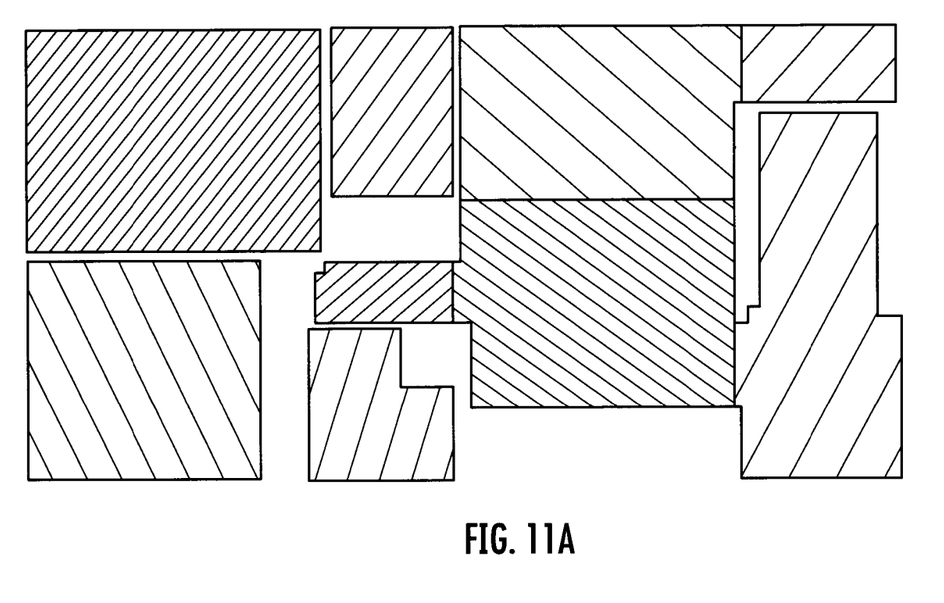
FIG. 11A is a graphical depiction of regions of free space separated by obstacle space obtained by the process of FIG. 9.
Figure 11B:
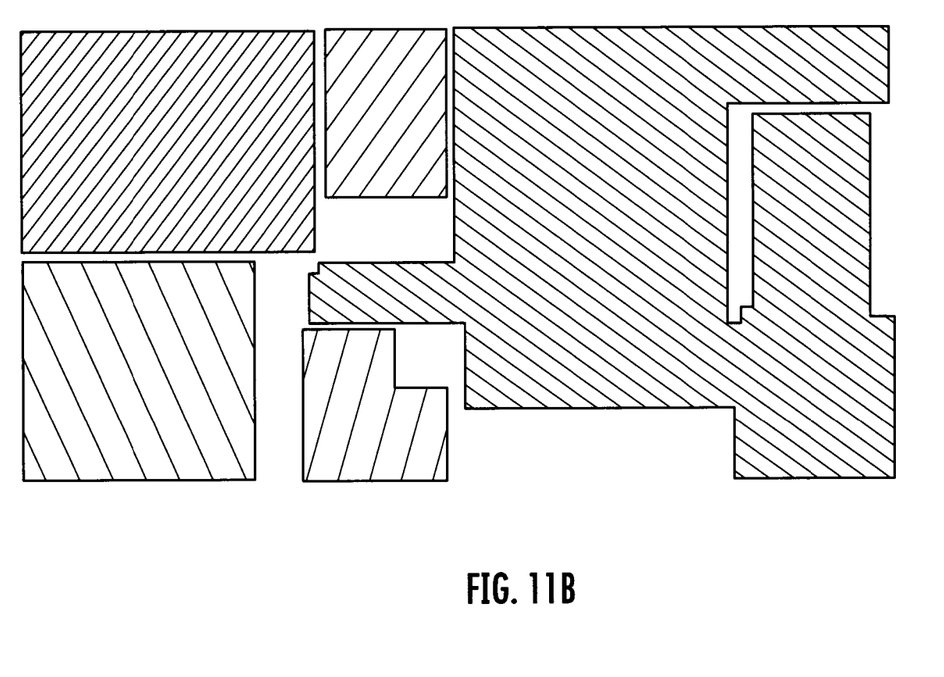
FIG. 11B is a graphical depiction of free space and obstacle space of FIG. 11A after areas of free space are merged to remove walls induced by the process of FIG. 9.

After the minimization problem is solved using an alpha expansion algorithm, the output of the energy minimization can be obtained. An example of such an output is depicted in FIG. 11A. This resulting room segmentation can lead to an overly segmented room in cases where imaginary walls are inferred. This condition arises in cases such as long corridors. To address this issue, post-processing called merging is implemented. To merge two regions, the overlap between the edge separating two regions and the wall primitives detected by the Random Sample Consensus process is evaluated. If the overlap is smaller than a predetermined threshold, the two regions are merged into one. In one embodiment, the predetermined threshold for the overlap comparison is 20 percent. An example of the result of merging regions on the map shown in FIG. 11A is shown in FIG. 11B. The resulting map of FIG. 11B is stored in the memory 112 and the controller 104 references the map to operate the actuators 116 and drive the motive members 120 to maneuver the mobile robotic device 100 through the mapped facility. The image data and environmental sensor data are used to detect objects within the mapped space and to confirm the location of the device relative to the map.

Variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed is:

1. A mobile robotic device comprising:
at least one motive member;
an actuator operatively connected to the at least one motive member, the actuator being configured to drive the motive member to move the mobile robotic device;
a data interface configured to receive point cloud data of a facility in which the robotic device operates;
a memory; and
a controller operatively connected to the actuator, the data interface, and the memory, the controller being configured to store the point cloud data received from the data interface in the memory, to segment the point cloud data into planar primitives, to detect openings in planar primitives that correspond to walls, to generate viewpoints for the planar primitives that correspond to ceilings and walls, to generate a map of rooms with reference to the generated viewpoints, and to operate the actuator with reference to the generated map to move the mobile robotic device through the rooms represented in the generated map.

2. The mobile robotic device of claim 1 further comprising:
an image sensor configured to generate image data of an environment about the mobile robotic device;
a distance sensor configured to generate data corresponding to a distance between the mobile robotic device and structure in a path of the mobile robotic device; and
the controller being operatively connected to the image sensor and the distance sensor, the controller being further configured to detect objects, walls, and openings in the walls about the mobile robotic device to locate the mobile robotic device with reference to the generated map.

3. The mobile robotic device of claim 2, the controller being further configured to:
identify wall primitives in the planar primitives segmented from the point cloud data;
identify ceiling primitives in the planar primitives segmented from the point cloud data;
identify floor primitives in the planar primitives segmented from the point cloud data;
identify the detected openings in the identified wall primitives as either doors or occlusions; and
generate the viewpoints with reference to the wall primitives and the ceiling primitives.

4. The mobile robotic device of claim 3, the controller being further configured to identify wall primitives, ceiling primitives, and floor primitives by:
projecting all of the data values in the point cloud data onto a two-dimensional grid aligned with an XY plane;
identifying all of the data values in the two-dimensional grid having a largest coordinate corresponding to height as belonging to one of the identified ceiling primitives;
identifying all of the points in the two-dimensional grid having a lowest coordinate corresponding to height as belonging to one of the floor primitives; and
identifying points in a plane between one of the ceiling primitives and one of the floor primitives as belonging to one of the wall primitives.

5. The mobile robotic device of claim 4, the controller being further configured to:
define each wall primitive as a Hessian normal form;
aligning a reference frame with each wall primitive;
projecting all of the data values identified as belonging to each wall primitive onto an image;
detecting openings in the image of each wall primitive; and
identifying the detected openings as doors or occlusions by comparing a shape of each detected opening to predetermined dimension and shape criteria.

6. The mobile robotic device of claim 5, the controller being further configured to:
project each ceiling primitive onto one of the floor primitives;
identify all data values within a boundary of the floor primitive onto which the ceiling primitive was projected as free space;
identify each wall primitive having identified openings within the boundary of the floor primitive onto which the ceiling primitive was projected as obstacle space;
perform an energy minimization of the free space and obstacle space;
identify a medial axis for each contiguous area of free space within the boundary of the floor primitive onto which the ceiling primitive was projected;
select data values that lie along the medial axis for each contiguous area of free space as viewpoints;
select data values with a predetermined radius about each selected data value on the medial axis until a number of data values not selected in each contiguous area of free space is less than a predetermined threshold.

7. The mobile robotic device of claim 6 wherein the predetermined radius corresponds to a range of a scanner used to produce the point cloud data.

8. The mobile robotic device of claim 7, the controller being further configured to:

select data values in the point cloud data that are within a sphere centered at each viewpoint in contiguous area of free space;
label the selected data values to identify the selected data values as corresponding to the viewpoint about which the sphere was centered to select the data values;
project the selected data values corresponding to one of the viewpoints onto a face of a cell complex data structure;
perform an energy minimization of a dual graph corresponding to the cell complex data structure, the dual graph having unary potentials associated with vertices representing faces in the cell complex data structure and binary potentials associated with edges representing walls in the cell complex data structure.

9. The mobile robotic device of claim 8, the controller being further configured to:
detect overlap between one of the edges separating different contiguous areas of free space and the wall primitives adjacent the different contiguous areas;
merging the different contiguous areas of free space in response to the detected overlap being less than a predetermined threshold.

\* \* \* \* \*